June 9, 1925. 1,541,032
E. J. DUMOUCHEL
FISH BAIT OR LURE
Filed July 16, 1924
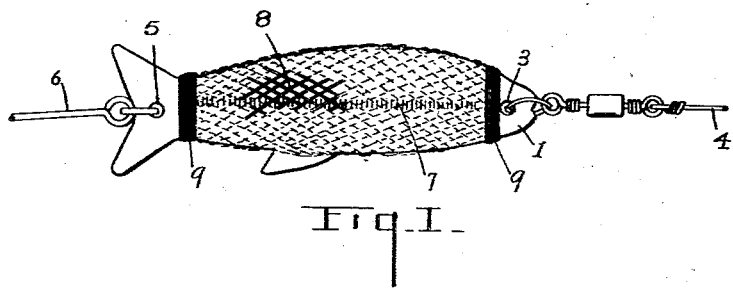
Fig. I.
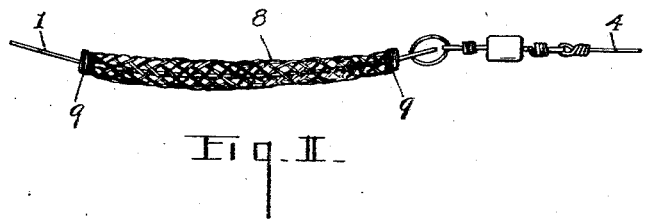
Fig. II.
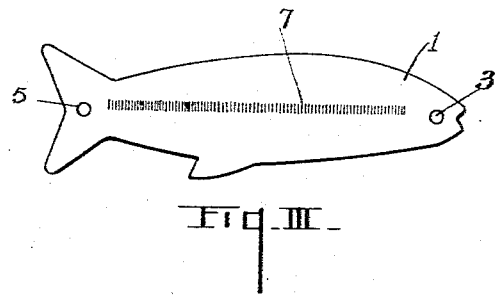
Fig. III.
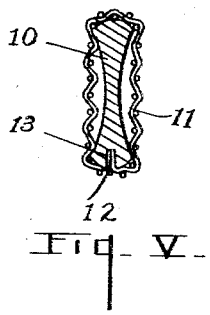
Fig. V.
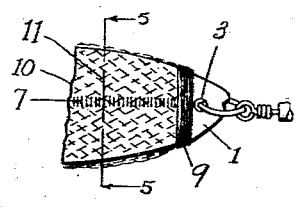
Fig. IV.
INVENTOR
Edward Dumouchel
BY Chappell & Earl
ATTORNEYS Patented June 9, 1925.

1,541,032

UNITED STATES PATENT OFFICE.

EDWARD J. DUMOUCHEL, OF KALAMAZOO, MICHIGAN, ASSIGNOR TO SHAKESPEARE COMPANY, OF KALAMAZOO, MICHIGAN.

FISH BAIT OR LURE.

Application filed July 16, 1924. Serial No. 726,282.

*To all whom it may concern:*

Be it known that I, EDWARD J. DUMOUCHEL, a citizen of the United States, residing at the city and county of Kalamazoo, State of Michigan, have invented certain new and useful Improvements in Fish Baits or Lures, of which the following is a specification.

This invention relates to improvements in fish baits or lures.

The main object of this invention is to provide an improved fish bait or lure which is attractive in appearance, is strong and durable, and at the same time economical in structure.

Objects pertaining to details and economies of construction of my invention will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this application, in which:

Fig. I is a side elevation of a fish bait or lure embodying the features of my invention, a portion of the reticulated covering being shown conventionally and the hook being partially broken away.

Fig. II is a top view of the structure shown in Fig. I, the hook being omitted.

Fig. III is a side view of the body of the bait shown in Figs. I and II.

Fig. IV is a fragmentary side elevation of a modified form of my invention.

Fig. V is a vertical section on a line corresponding to line 5—5 of Fig. IV.

In the drawing the similar reference numerals indicate similar parts in all of the views.

Referring to the drawing, the bait shown in Figs. I and II is a trolling bait. The body 1 is formed of metal in the general outline of a minnow, being stamped from a flat piece of metal and bowed longitudinally as shown in Fig. II.

At the front end of the bait body is a hole 3 for attachment of the line 4. At the rear end of the body is a hole 5 for attachment of the hook 6. The body preferably has a polished or bright finish to provide a reflecting surface and in the structure illustrated has a longitudinal strip 7 in color contrasting with the remainder of the surface.

Around the body I wrap a wire net 8, this net being supported in spaced relation to the sides of the body so that the reflecting surface of the body is visible therethrough. This gives the general appearance of glistening scales and is very attractive. The net may be of colored wire but I find it very satisfactory to use plain plated wire net.

The edges of the net are secured along the under side of the body and I preferably provide wrappings 9 at the ends of the net, these wrappings being of light wire or of thread.

In the modification shown in Figs. IV and V the body 10 is formed of wood and has vertically concaved sides, the net 11 being wrapped about the same substantially as in Figs. I and II. The edges 12 of the net are secured in a groove 13 in the bottom of the body.

The sides of the body may be finished as desired to provide a reflecting or contrasting surface over which the net is disposed so that the surface is visible through the net, a general scale-like effect or appearance resulting when the covering is formed of woven wire.

My improved fish bait or lure is very attractive in appearance, is efficient, and at the same time is very strong and durable.

Having thus described my invention what I claim as new and desire to secure by Letters Patent is:

1. A fish bait or lure comprising a longitudinally bowed body of metal finished to provide reflecting surfaces, and a wire net wrapped about said body with parts of the body projecting at the front and rear, the ends of the net being secured by external wrappings.

2. A fish bait or lure comprising a longitudinally bowed body of metal finished to provide reflecting surfaces, and a wire net wrapped about said body.

3. A fish bait or lure comprising a body of metal finished to provide reflecting surfaces, and a wire net wrapped about said body with parts of the body projecting at the front and rear, the ends of the net being secured by external wrappings.

4. A fish bait or lure comprising a body of metal, finished to provide reflecting surfaces, and a wire net wrapped about said body.

5. A fish bait or lure comprising a body finished to provide reflecting surfaces, and a covering of reticulated metal supported in spaced relation to the reflecting surface so that such surfaces are visible therethrough.

6. A fish bait or lure comprising a body, and a covering therefor of open mesh material through which the surface of the body is visible providing a scale-like appearance.

7. A fish bait or lure comprising a body finished to provide a reflecting surface, and a covering of open mesh material supported in spaced relation to the surface of the body and through which the surface of the body is visible.

In witness whereof I have hereunto set my hand and seal.

EDWARD J. DUMOUCHEL. [L. S.]